United States Patent [19]
Casey

[11] Patent Number: 6,018,230
[45] Date of Patent: Jan. 25, 2000

[54] APPARATUS AND METHOD FOR INTERRUPTING CHARGING OF SELF-CHARGING ELECTRONIC DEVICE

[76] Inventor: John P. Casey, 9090 N. 75th St., Milwaukee, Wis. 53223

[21] Appl. No.: 09/094,826

[22] Filed: Jun. 15, 1998

[51] Int. Cl.[7] ........................................... H02J 7/00
[52] U.S. Cl. .............................. 320/114; 320/107
[58] Field of Search ..................... 320/114, 107; 429/96–100

[56] References Cited

U.S. PATENT DOCUMENTS

| | | | |
|---|---|---|---|
| 4,731,813 | 3/1988 | Schroeder | 455/410 |
| 4,810,833 | 3/1989 | Meyers | 439/136 |

*Primary Examiner*—Peter S. Wong
*Assistant Examiner*—Lawrence Luk
*Attorney, Agent, or Firm*—Reinhart, Boerner, Van Deuren, Norris & Rieselbach, S.C.

[57] ABSTRACT

A method and apparatus for preventing a rechargeable battery in a self-charging electronic device from being charged while the electronic device is resting in a charging cradle comprising placing an isolation element between a first set of electrical contacts on a charging cradle and a second set of electrical connections on a self-charging device. The isolation element preferably comprises a material with a sufficiently high dielectric constant to prevent current from flowing from the first set of electrical contacts to the second set of electrical contacts. Therefore, the rechargeable battery is not subjected to a constant recharging current flow which can limit the total recharge capacity of the battery.

20 Claims, 2 Drawing Sheets

APPARATUS AND METHOD FOR INTERRUPTING CHARGING OF SELF-CHARGING ELECTRONIC DEVICE

BACKGROUND

This invention relates to self-charging electronic devices which, when not in use, rest in a charging cradle. The charging cradle provides both a location to store the device and the circuitry and electrical contacts to recharge the self-charging electronic device when it is not in use. Specifically, this invention relates to an apparatus and method for preventing the batteries in the electronic device from being continually charged while resting in the charging cradle.

Self-charging electronic devices such as cordless telephones, drills, screw drivers and other devices are well known. These self-charging devices include a rechargeable batteries or other rechargeable power supplies, and therefore do not have to be connected to a power supply by permanent cords or wiring. These devices, therefore, can be operated at locations remote from a power supply, and are particularly useful outdoors or in hard to reach places. When not in use, self-charging devices typically rest in a charging cradle or other device which provides both a place to store the device and the electrical circuitry and electrical contacts to recharge the batteries in the self-charging device.

The electronic devices can be powered by rechargeable batteries, such as sealed lead acid or nickel-cadmium ("nicad") batteries. Nicad batteries have become increasingly popular due to their ability to maintain a charge for a significant period of time, their ability to supply sufficient current to power remote electronic devices, and their small size. The use of nicad batteries has made rechargeable electronic devices smaller and easier for consumers to handle.

Nicad batteries, however, suffer from several disadvantages. Specifically, the charge and discharge cycles of nicad batteries exhibit a "memory" effect which may prevent the battery from fully charging after the initial use. For example, nicad batteries may not recharge to full capacity if they are not completely discharged before a recharging current is applied. In fact, the first discharge after a long period of charging may provide as little as 50% of the batteries nominal capacity.

To prevent the memory problem, it is necessary to allow the battery to discharge to a low charge level before applying a charging current, and then apply a charging current to restore the battery to fill strength. When stored in a charging cradle, however, the battery is continually recharged, regardless of the charge level of the battery.

It is therefore an object of the invention to extend the available use time of the rechargeable battery in a self-charging electronic device.

It is still another object of the invention to limit the memory effects on a rechargeable battery in a self-charging device.

It is yet another object of the invention to selectively apply charging current to a self-charging electronic device when the electronic device is resting in a charging cradle.

It is still another object of the invention to prevent the unwanted charging of a rechargeable battery in a self-charging electronic device.

It is a still further object of the invention to interrupt the charging current between a first set of charging contacts located in a charging cradle and a second set of charging contacts located in a self-charging electronic device.

It is yet a further object of the invention to provide a removable isolation plate which can be positioned between a first set of charging contacts located in a charging cradle and a second set of charging contacts located in a self-charging electronic device.

SUMMARY OF THE INVENTION

The invention comprises a method and apparatus for preventing a rechargeable battery in a self-charging electronic device from charging while the electronic device is resting in a charging cradle. The apparatus includes an isolation element which is positioned between a first set of electrical contacts located in the charging cradle and a second set of electrical contacts located in the electronic device. The isolation elements prevents current flow between the first and second sets of electrical contacts so that, when the device is resting in the cradle, charging current is not supplied to the battery. The isolation element can be removed to selectively allow an electrical connection between the first and second sets of electrical contacts to provide charging current to the battery as required to charge the battery.

DETAILED DESCRIPTION OF THE PREFERRED EMBODIMENT

Figure 1:
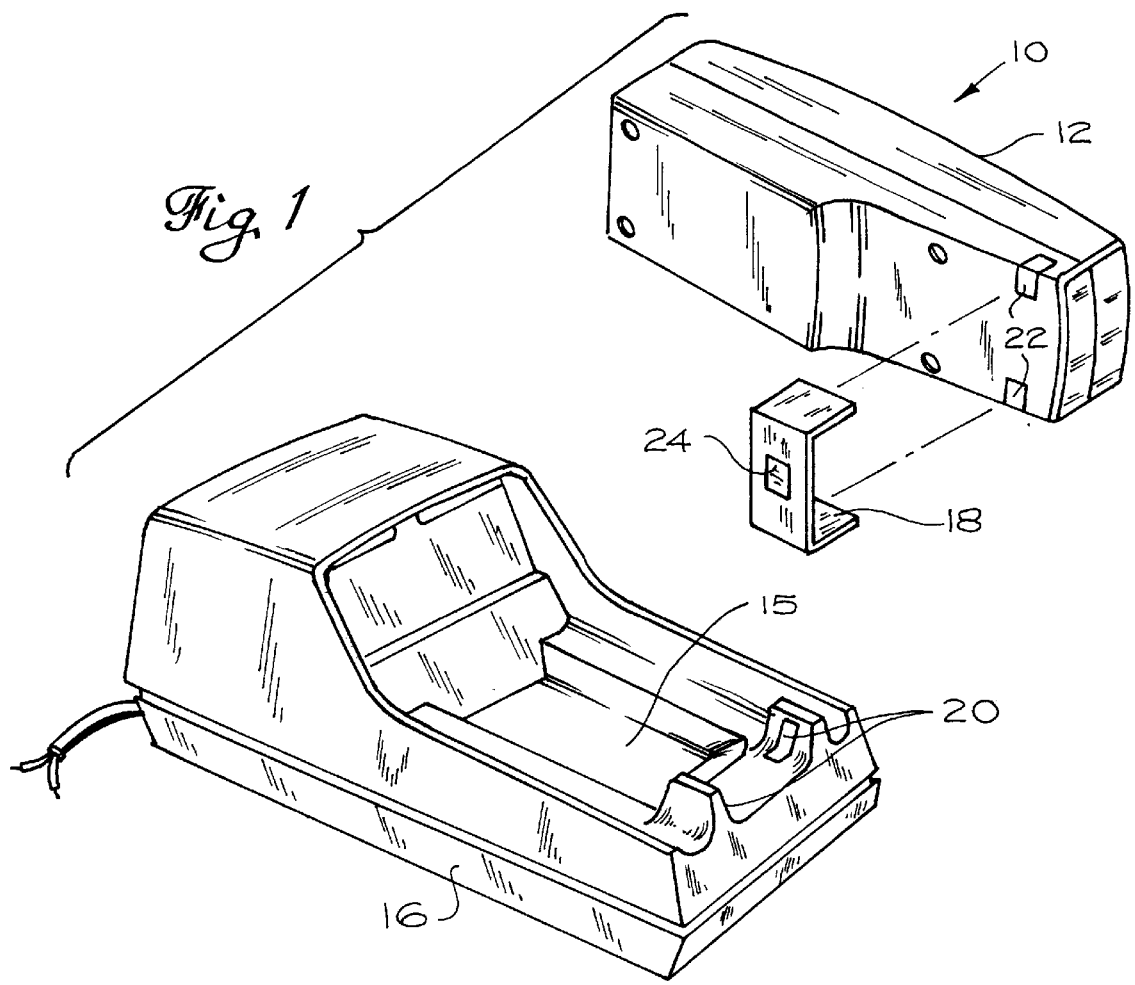
FIG. 1 is an exploded view of a self-charging electronic device using the isolation apparatus of the present invention.
Figure 2:
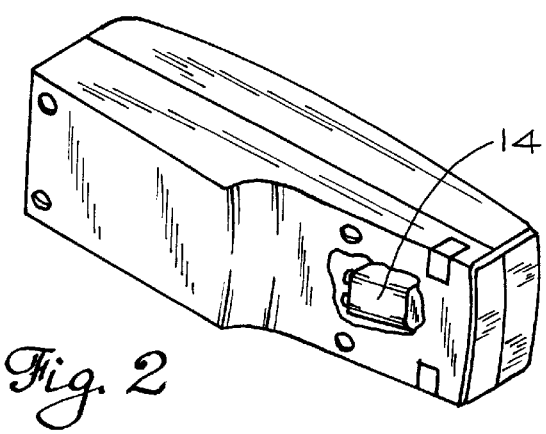
FIG. 2 is a partially cut-away view of the electronic device shown in FIG. 1 to illustrate the rechargeable battery.

Referring to the Figures, and more particularly to FIG. 1, a self-charging device employing the present invention is shown at 10. A self-charging electronic device 12, including a rechargeable battery 14 (FIG. 2) is positioned in a device cavity 15 of a charging cradle 16. The charging cradle 16 includes circuitry which supplies a charging current to a set of electrical charging contacts 20. The self-charging electronic device 12 includes a second set of electrical charging contacts 22 which are connected to the rechargeable battery 14. An electrical connection between the first set of charging contacts 20 and the second set of charging contacts 22 supplies a charging current from the charging cradle 16 to the rechargeable battery 14. The charging current, therefore, is supplied to the rechargeable battery 14 whenever the self-charging electronic device 12 is resting in the charging cradle 16. Although two electrical contacts are shown in each set of electrical contacts 20 and 22, it is understood that each set of electrical contacts could include two or more electrical contacts.

To prevent the charging current from charging the battery 14, an isolation element 18 is positioned between the first set of charging contacts 20 and the second set of electrical contacts 22. The isolation element 18 prevents an electrical connection between the two sets of electrical contacts, and therefore prevents current from flowing from the charging cradle 16 to the rechargeable battery 14. A coupling element 24 can removably couple the isolation element 18 to the charging cradle 16 to ensure that the isolation element remains positioned between the first set of electrical contacts 20 and second set of electrical contacts 22. Alternatively, the coupling element 24 can removably couple the isolation element 18 to the electronic device 12. Although the isolation element 18 shown in FIG. 1 is generally U-shaped, the shape of the isolation element 18 can be varied as is required by the shape of a given self-charging electronic device 12 and charging cradle 16. For example, in some cases the electrical contacts may be positioned entirely in a flat portion of the device cavity 15. In this case, a generally flat isolation element 18, as is seen in FIGS. 3B–3E may be used. Other configurations are possible, depending on the location, shape and number of electrical contacts in a device.

Referring again to FIG. 1, the isolation element 18 is designed to fit into the device cavity 15 of the charging cradle 16, thereby covering the first set of electrical contacts 20. The isolation element 18 can be dimensioned in any way required to both: (1) fit into the device cavity 15 of the charging cradle 16 while still allowing sufficient space for the electronic device 12 to rest on the charging cradle 16 without slipping; and (2) isolate the electrical contacts 20 in the charging cradle 16 from the electrical contacts 22 in the electronic device 12. Preferably, a coupling element 24 removably couples the isolation element 18 to the charging cradle 16. The coupling element 24 may comprise hook and loop type fasteners, removable screws, magnets, or other known temporary coupling devices. The isolation element 18 may further comprise a removal element 26, as is seen in FIGS. 3A–3E. The isolation element 26 can comprise a flange, a handle, a ring, or any other device suitable for grasping and removing the isolation element 18 from the charging cradle 16 when charging of the rechargeable battery 14 is desired. The removal element 26 is preferably substantially perpendicular to the isolation element 18. However, the removal element 26 may also be coupled to the isolation element 18 at an angle, provided sufficient space is provided allow a user to grasp the removal element 26.

Figure 3A:
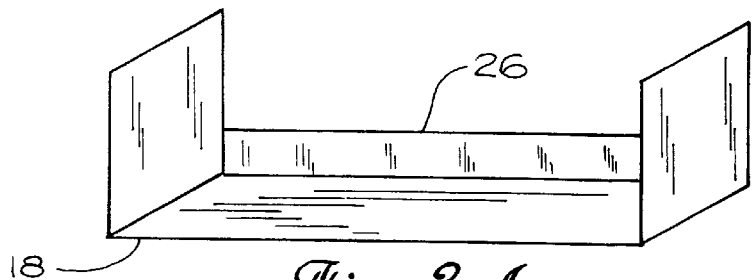
FIGS. 3A–3F show various configurations of the isolation element shown in FIG. 1.
Figure 3B:
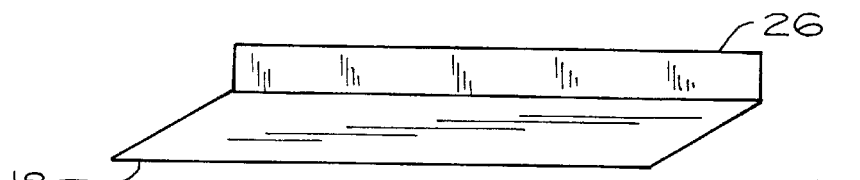
Figure 3C:
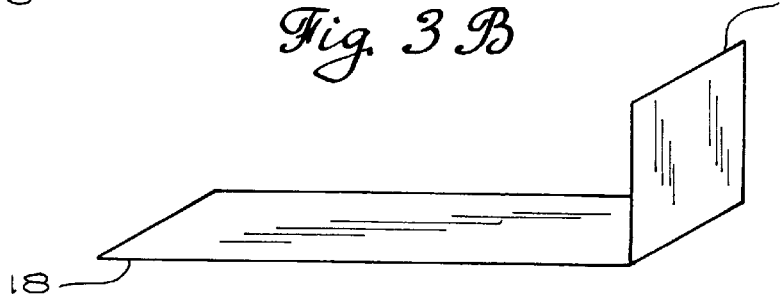
Figure 3D:
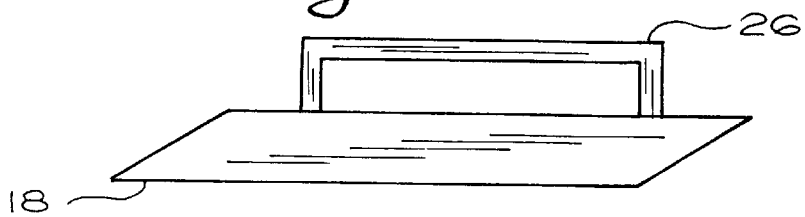
Figure 3E:
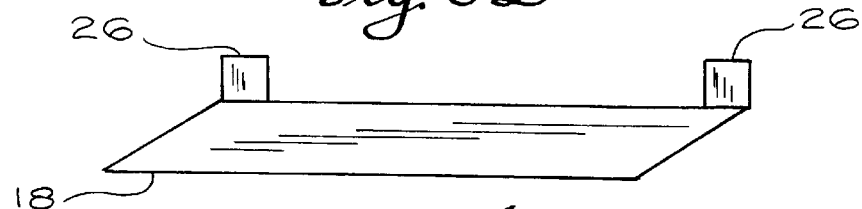
Figure 3F:
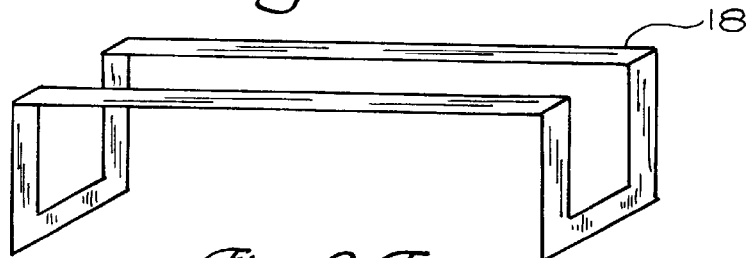

The isolation element 18 preferably comprises a solid insulating material with sufficient dielectric constant to prevent current flow between the first set of electrical contacts 20 and the second set of electrical contacts 22 when the isolation element 18 is in physical contact with both sets of contacts. For example, the isolation element 18 may comprise teflon, polyester, or nylon. Alternatively, the isolation element 18 may comprise a frame, stanchion, or other device which prevents a physical connection between the two sets of electrical contacts 20 and 22 and provides an air gap of sufficient length to prevent arcing or current flow between the contacts (see FIG. 3F). A generally flat isolation element 18 may also include ridges or impressions formed to match the shape of the electrical contacts 20. This configuration is particularly desirable when the electrical contacts 20 normally extend above the plane surface of the charging cradle 16. While a solid insulating material is preferred the isolation element 18 can also comprise a gas or liquid insulator.

As noted above, the isolation element 18 is used to interrupt the flow of charging current from the charging cradle 16 to the rechargeable battery 14 in the self-charging device 12. The isolation apparatus, therefore prevents a constant flow of current from the charging cradle 16 into the rechargeable battery 14, which can prevent the battery from fully charging. When the battery is discharged through normal use, as is conventionally indicated by LEDs or other indicating devices on the self-charging electronic device, the user can remove the isolation element 18. When the isolation element 18 is removed, an electrical connection is made between the first set of electrical contacts 20 and second set of electrical contacts 22. This connection allows current to flow from the charging cradle 16 to the rechargeable battery 14 in the electronic device 12, thereby recharging the battery 14. Therefore, the user can control the recharging of the rechargeable battery 14, and prevent the memory effects associated with nicad and other types of batteries.

Although the isolation element 18 is shown coupled to the electrical contacts 20 on the charging cradle 16, a similar result is achieved by applying the isolation element 18 to the charging contacts 22 on the electronic device 12. Furthermore, the isolation element 18 can be configured to cover either the charging contacts alone, or the entire device cavity of the charging cradle 16. Additionally, a separate isolation element could cover individual contacts in each set of electrical contacts 20 or 22.

While preferred embodiments have been illustrated and described, it should be understood that changes and modifications can be made thereto without departing from the invention in its broadest aspects. Various features of the invention are defined in the following claims.

I claim:

1. An isolation apparatus for preventing the charging of a rechargeable battery in a self-charging electronic device when the self-charging electronic device is positioned in a charging cradle, the isolation apparatus comprising:

an isolation element removably positioned between a first set of electrical contacts in the charging cradle and a second set of electrical contacts in the self-charging electronic device, the isolation element preventing an electrical connection between the first set of electrical contacts and the second set of electrical contacts, thereby preventing charging of the rechargeable battery.

2. The isolation apparatus of claim 1, wherein the electronic device comprises a cordless telephone.

3. The isolation apparatus of claim 1, wherein the isolation element comprises a dielectric material which prevents current flow between the first and second sets of electrical contacts.

4. The isolation apparatus of claim 1, further comprising a coupling element for removably coupling the isolation element to the self-charging electronic device.

5. The isolation apparatus of claim 1 wherein the battery comprises a nicad battery.

6. The isolation apparatus of claim 4 wherein the coupling element comprises hook and loop fasteners.

7. The isolation apparatus of claim 4, wherein the coupling element comprises a screw extending through the isolation element into the charging cradle.

8. The isolation apparatus of claim 4, wherein the coupling element comprises a hinge between a surface of the isolation element and a surface of the charging cradle.

9. The isolation element as defined in claim 4, further comprising a flange extending in a direction substantially perpendicular to the isolation element, for grasping and removing the isolation element from the charging cradle.

10. A method for preventing a rechargeable battery in a self-charging electronic device from being charged while the electronic device is resting in a charging cradle, the method comprising the steps of:

placing an isolation element on the device cavity of the charging cradle to cover a first set of electrical contacts on the charging cradle;

removably coupling the isolation element to the charging cradle;

placing the self-charging electronic device in the charging cradle such that an isolation element is positioned between the first set of electrical contacts and the second set of electrical contacts;

removing the isolation element from the charging cradle; and positioning the self-charging electronic device in the charging cradle such that the first set of electrical contacts electrically connects with the second set of electrical contacts, thereby allowing the rechargeable battery to recharge to full capacity.

11. The method as defined in claim 10, further comprising the step of providing a flange on said isolation element, and grasping the flange to remove the isolation element from the charging cradle.

12. The method as defined in claim 10, wherein said isolation element comprises a solid dielectric material which prevents current flow between the first and second sets of electrical contacts.

13. The method as defined in claim 10, further comprising the step of providing a hook and loop fastener between the charging cradle and the isolation element.

14. An isolation apparatus for preventing the charging of a rechargeable battery in a self-charging electronic device when the self-charging electronic device is positioned in a charging cradle, the isolation apparatus comprising:

an isolation element removably coupled to the charging cradle to provide electrical isolation between a first set of electrical contacts in the charging cradle and a second set of electrical contacts in the self-charging electronic device;

a coupling element for removably coupling the isolation element to the charging cradle; and a flange extending in a direction substantially perpendicular to the isolation element, for grasping and removing the isolation element from the charging cradle.

15. The isolating apparatus as defined in claim 14, wherein the coupling element comprises hook and loop type fasteners.

16. The isolation apparatus as defined in claim 14, wherein the rechargeable battery comprises a nicad battery.

17. The isolation apparatus as defined in claim 14, wherein the self-charging electronic device comprises a cordless telephone.

18. The isolation apparatus as defined in claim 14, wherein the coupling element comprises a hinge coupled between a side of the charging cradle and the isolation element.

19. The isolation apparatus of claim 14, wherein the isolation element comprises a solid dielectric material which prevents current flow between the first and second sets of electrical contacts.

20. The isolation apparatus of claim 14, wherein the isolation element comprises a frame, positioned between the charging cradle and the self-charging electrical device, which provides an air gap and prevents current flow between the first and second sets of electrical contacts.

* * * * *